J. H. HICKEY.
ANTI-OVERHEATING DEVICE.
APPLICATION FILED DEC. 13, 1917.
1,280,029.
Patented Sept. 24, 1918.
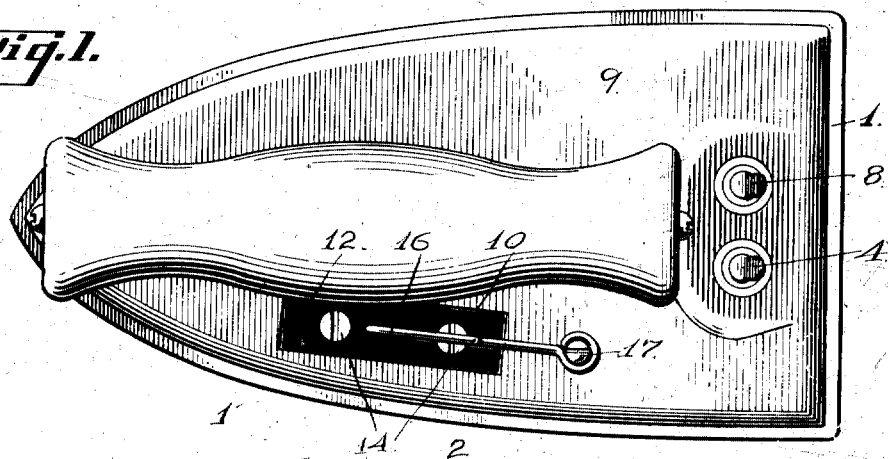
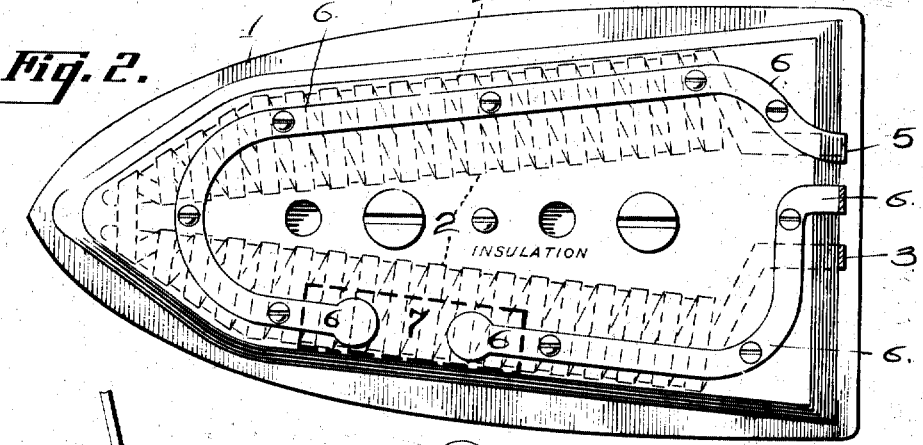
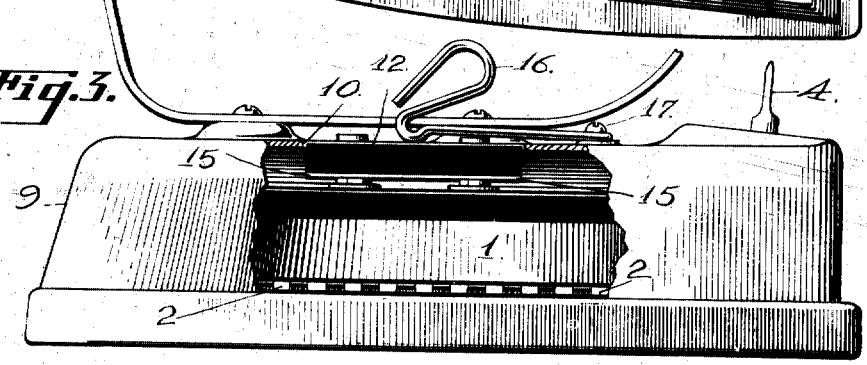
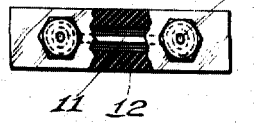 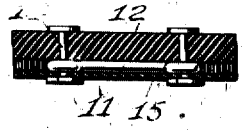
INVENTOR.
John H. Hickey
BY
Arthur L. Lee
ATTORNEY

UNITED STATES PATENT OFFICE.

JOHN H. HICKEY, OF SAN FRANCISCO, CALIFORNIA.

ANTI-OVERHEATING DEVICE.

1,280,029.  Specification of Letters Patent.  Patented Sept. 24, 1918.

Application filed December 13, 1917. Serial No. 207,213.

*To all whom it may concern:*

Be it known that I, JOHN H. HICKEY, a citizen of the United States, residing in the city and county of San Francisco and State of California, have invented a new and useful Improvement in Anti-Overheating Devices, of which the following is a specification.

My invention relates to improvements in anti-overheating devices wherein the melting of the device automatically operates to discontinue the flow of the heat producing energy.

The present invention has for its object the provision of a controlling element for heating units in which the said element is melted by a predetermined degree of heat radiated from the unit, to automatically and permanently discontinue the operation of the heat producing energy.

While the broad principle involved may be utilized in various ways and devices I have illustrated the same as used in connection with an electrical heating coil such as is commonly used in flat irons. The device should in no way be confounded with an ordinary electrical fuse where said fuse is "blown" or melted by a sudden surge of electrical current or a sudden increase of amperage. When used in connection with electrical heating units the controlling element or fusible connection has a far greater capacity or conductivity than the heating coil, said heating coil being properly protected against excessive amperage by proper fuses installed in the electrical wiring of the establishment or plant in which said electrical coil is used. Therefore the fusible controlling element can only be melted by an excessive degree of heat radiated from the heating coil or from the device within which the heating coil is installed.

As the controlling element is detachable it may be easily replaced by a new element when the old one has been melted.

I accomplish these several objects by means of one form which I have illustrated in the drawings forming a part of the present specification wherein like characters of reference are used to designate similar parts throughout the said specification and drawings, and in which—

Figure 1 is a plan view of an electrical iron disclosing my invention applied thereto;

Fig. 2 is a plan view of the iron with the housing and handle removed;

Fig. 3 is a broken side elevation disclosing the manner in which the fusible connection is normally retained in series with the coil;

Fig. 4 is a bottom plan view of the fusible insulated connection partly broken to disclose the connection; and Fig. 5 is a longitudinal sectional view of Fig. 4.

Referring to the drawings the numeral 1 is used to designate an electrical iron having the usual heating coil 2 therein. One end 3 of the coil 2 is connected in the usual manner to one terminal 4 while the opposite end 5 of the coil 2 is connected by means of a connection 6, having a gap 7 therein, to the other or remaining terminal 8 of the iron 1.

The iron 1 is provided with a housing 9 having an aperture 10 in the upper surface thereof and arranged directly over the gap 7 in the connection 6.

A fusible controlling element or connection 11 is embedded within an insulating block 12 provided with suitable screws or contacts 14 between which the fusible connection or controlling element 11 is connected.

The block 12 is placed within the aperture 10 of the housing 9 so that the contacts 14 rest upon the ends of the connection 6 adjacent the gap 7 therein, thereby placing the connection 11 in series with the heating coils 2 of the iron 1.

The contacts 14 and connection 11 are normally held in series with said coils 2 by means of a spring latch 16 pivotally mounted as at 17 near the aperture 10 within the housing 9.

The face of the block 12 on the side which contains the connection 11 is covered with any suitable transparent insulating material 11 such as mica or the like.

In operation, the fuse or connection 11 is of greater conductivity than the coil 2 so that any sudden surge of electrical current capable of being carried by the said coils 2 will not "blow" or melt said fuse or connection 11.

Just before the heat radiated by the coils 2 is of sufficient degree to propagate a flame the connection 11 is melted and the flow of current through the coils 2 is permanently interrupted thereby automatically preventing the further production of heat by said coils 2.

Any melted particles of the connection 11 will be retained within the block 12 by the insulated covering 11 thereon and when the latch 16 is moved away from the aperture 10 within the housing 9 the melted connection 11 and block 12 may be removed and a new block and connection of similar construction placed in series with the coil 2 by inserting same in said aperture 10 and replacing the spring latch 16 to normally retain said new connection 11 in contact, and thereby in series with the coil 2.

It is obvious from the foregoing that I have provided improved means for automatically preventing the overheating of heating coils.

Having thus described my invention what I claim as new and desire to secure by Letters Patent is—

1. The combination with an electrical iron and heating coil therefor of a housing having an aperture within the upper surface thereof; a connection from one end of the coil to one of the terminals of the iron and having a gap therein arranged beneath the aperture within the housing; and an insulated detachable fusible connection arranged within the aperture to bridge the gap in the first mentioned connection and adapted to be melted at a predetermined degree of heat radiated from the coil whereby the operation of said coil may be discontinued.

2. The combination with an electrical iron and heating coil therefor of a housing having an aperture within the upper surface thereof; a connection from one end of the coil to one of the terminals of the iron and having a gap therein arranged beneath the aperture within the housing; and an insulated detachable fusible connection arranged within the aperture to bridge the gap in the first mentioned connection and adapted to be melted at a predetermined degree of heat radiated from the coil whereby the operation of said coil may be discontinued; and means for normally retaining the fusible connection in series with the coil and first mentioned connection.

3. The combination with an electrical iron and heating coil therefor of a housing having an aperture within the upper surface thereof; a connection from one end of the coil to one of the terminals of the iron and having a gap therein arranged beneath the aperture within the housing; and an insulated detachable fusible connection arranged within the aperture to bridge the gap in the first mentioned connection and adapted to be melted at a predetermined degree of heat radiated from the coil whereby the operation of said coil may be discontinued; and a suitable latch pivotally mounted upon the housing near the aperture therein to normally retain the fusible connection in series with the coil and first mentioned connection.

In witness whereof I hereunto set my signature.

JOHN H. HICKEY.